324-77

SEARCH ROOM

ELECTRONIC TESTING EQUIPMENT

Filed May 4, 1964

INVENTOR
WALTER K. BOCKHOLT

BY James H. Griffin

ATTORNEY

INVENTOR
WALTER K. BOCKHOLT
BY James H. Griffin
ATTORNEY

INVENTOR
WALTER K. BOCKHOLT
BY James H. Griffin
ATTORNEY

United States Patent Office 3,382,435

Patented May 7, 1968

3,382,435

ELECTRONIC TESTING EQUIPMENT

Walter K. Bockholt, Redwood City, Calif., assignor to Ampex Corporation, Redwood City, Calif., a corporation of California Filed May 4, 1964, Ser. No. 364,590
2 Claims. (Cl. 324—77)

Figure 1A:
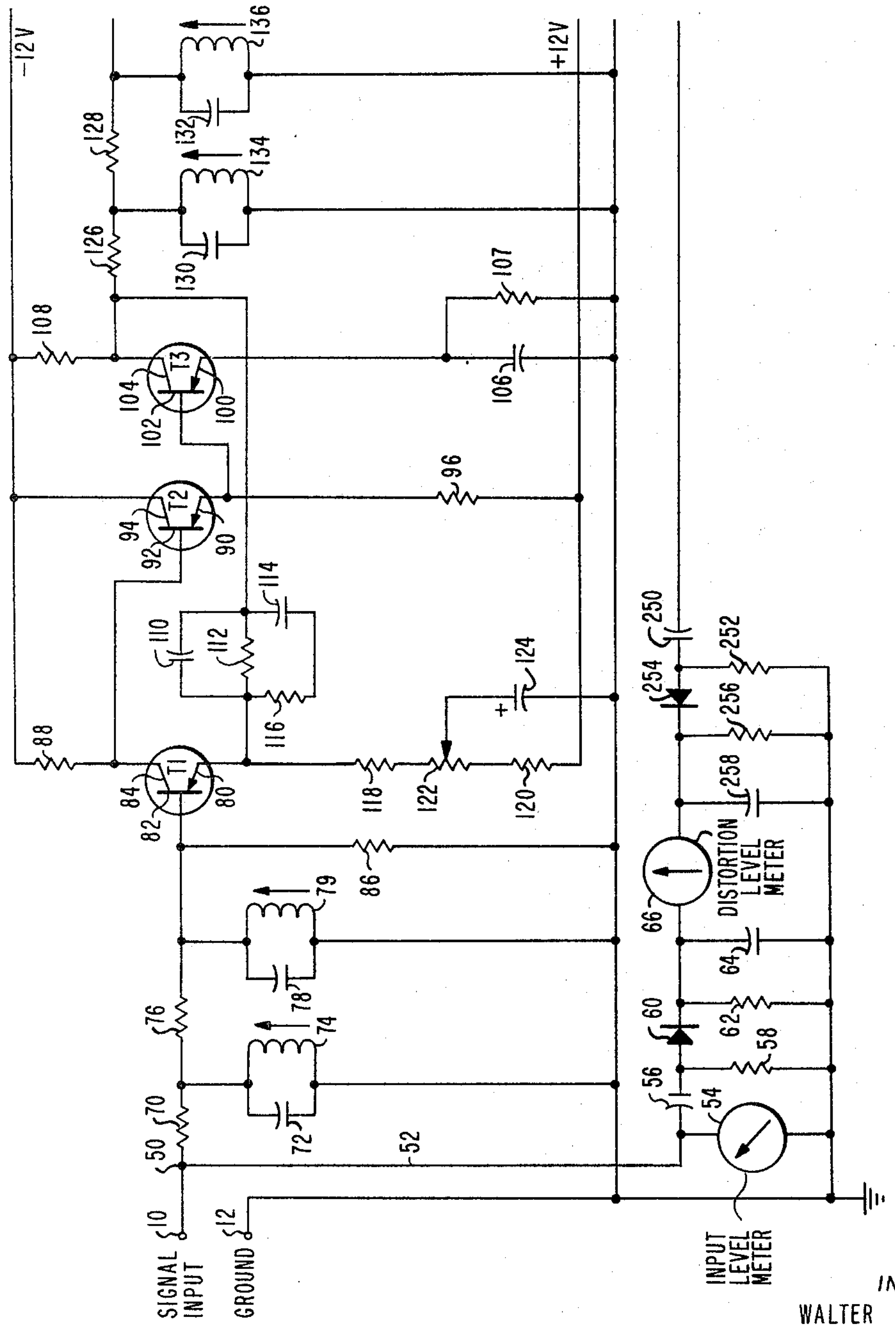

This invention relates in general to electronic testing equipment and more particularly to equipment for measuring and adjusting the distortion level of an electronic signal.

Applicant's distortion level monitor will be described in connection with magnetic tape recorder applications, but it is to be understood that this invention may be applied to electronic equipment of all types wherein it is necessary to monitor signal harmonic distortion or to adjust it to a predetermined level. In the magnetic tape recorder field, the main figure of merit or standard in regard to distortion is that of percentage third harmonic distortion. Second harmonic distortion is also of great interest in some cases; but third harmonic distortion is the most prominent because it indicates the presence of signal flattening due to saturation of tape and head. Since the signal-to-noise ratio of a tape recorder improves as the signal level of the recorder is raised, much effort is expended to adjust the signal level as high as possible without reaching too far into the tape or head saturation level, where flattening and third harmonic distortion occur. Many tape recorder manufacturers specify a certain percentage third harmonic distortion (usually at 1 kc.; but sometimes at 100 kc. or 25,000 kc.) which their recorder will not exceed; as for example, one percent third harmonic distortion.

Varying brands or types of tapes for use in magnetic tape recorders will have varying signal levels in a given machine beyond which they cannot operate without an increase in distortion above the specified level. Even variations of the speed of the same tape in the same machine will alter the distortion level. Thus, whenever the tape speed, brand, or type in any tape recorder is changed, it is necessary to readjust the record level of the tape recorder so as not to exceed the critical distortion point of the new tape or tape speed. The record level of a tape recorder is changed by altering the gain of its direct record amplifiers while feeding in a test signal and analyzing the output of the recorder to ascertain percentage third harmonic distortion.

Prior distortion level analyzing equipments were heavy and costly, and their operation was so complicated that record level adjustment of just one tape channel often took ten minutes or more. In the operation of such an analyzer, a test signal was fed in and a band-pass filter was tuned to pass some desired harmonic of the test signal. In order to monitor percentage harmonic distortion, it was necessary to switch back and forth, taking readings first of the entire test signal and then of the passed harmonic. Naturally, any change in input level of the test signal while these observations were being made would require that they be recommenced. Thus, with tape recorders having fourteen tracks or more, the adjustment process could be oppressively lengthy, making frequent testing impossible. In practice the main problem causing this difficulty of adjustment was that the prior distortion analyzers changed readings (due to variation in input level) whenever the tape structure varied in any way—a phenomenon known as "reproduce bounce."

It is, therefore, the general object of this invention to provide an improved distortion level monitor.

Another object of this invention is to provide a distortion level monitor that can shorten the time required to adjust the record level of a magnetic tape recorder.

Another object of this invention is to provide a distortion level monitor which is cheaper, lighter, and therefore more easily adaptable to a large, composite test set than prior equipment used for this purpose.

In the achievement of these and other objects and as a feature of applicant's invention, there is provided a distortion level monitor which compares the total output signal of a magnetic tape recorder under test with some selected harmonic from the output signal. A preferred test set according to the principles of the invention processes this output signal in the following manner: the signal is first divided into two paths which lead to opposite sides of a distortion level meter—essentially a center scale voltmeter. The first such path merely rectifies the signal being sampled and then smoothes it before applying it to the distortion level meter. The second path consists of band-pass filters and amplifying circuits which separate out a given harmonic of the test signal (usually the second or third harmonic) and then amplify it by a large factor (usually 100 plus an additional amount to compensate for filter insertion loss). The amplification factor is so selected and adjusted in the amplifiers of the distortion level monitor that after the amplified harmonic is rectified, smoothed, and applied to the opposite side of the distortion level meter from the full signal, the distortion level meter will read zero when the record level of the magnetic tape recorder is such as to achieve the desired percentage harmonic distortion.

It should be noted that a very simple and inexpensive distortion level monitor could be constructed in accordance to the principles of applicant's invention by dividing a test signal from a tape recorder, separating out one harmonic with a simple band-pass filter while attenuating the whole signal, then applying the harmonic to one side and the attenuated signal to the other side of a vacuum tube voltmeter, which need not be a part of the special test equipment. Thus, a very simple package containing only the filter and the attenuator (with the latter properly adjusted according to some shop standard equipment) could be supplied in each tape recorder or in a small easily operating customer test set. Any standard vacuum tube voltmeter would then be plugged into the filtered attenuator package only when it is in use.

In essence then, the principle of applicant's invention is to monitor percentage harmonic distortion of an input signal by separating out the harmonic from the whole input signal, then applying the harmonic and the whole signals to opposite sides of a voltmeter or the like at predetermined levels of attenuation. These predetermined attenuation levels may be selected such that the voltmeter will read zero when the harmonic is some certain percentage of the whole input signal being analyzed.

Since the above described distortion level monitor is a balanced system dealing only in percentage, it is not affected by the reproduce bounce phenomenon described above or by any of the other fluctuations of input level often encountered in tape recorder equipment. Monitors constructed in accordance with this invention may be small, inexpensive, and simple to operate; thus, they could be easily incorporated in a composite test set and, indeed, might well be incorporated as an integral part of a tape recorder, so that the alignment process could be performed frequently and the recorder could be operated in peak performance at all times.

Figure 1B:
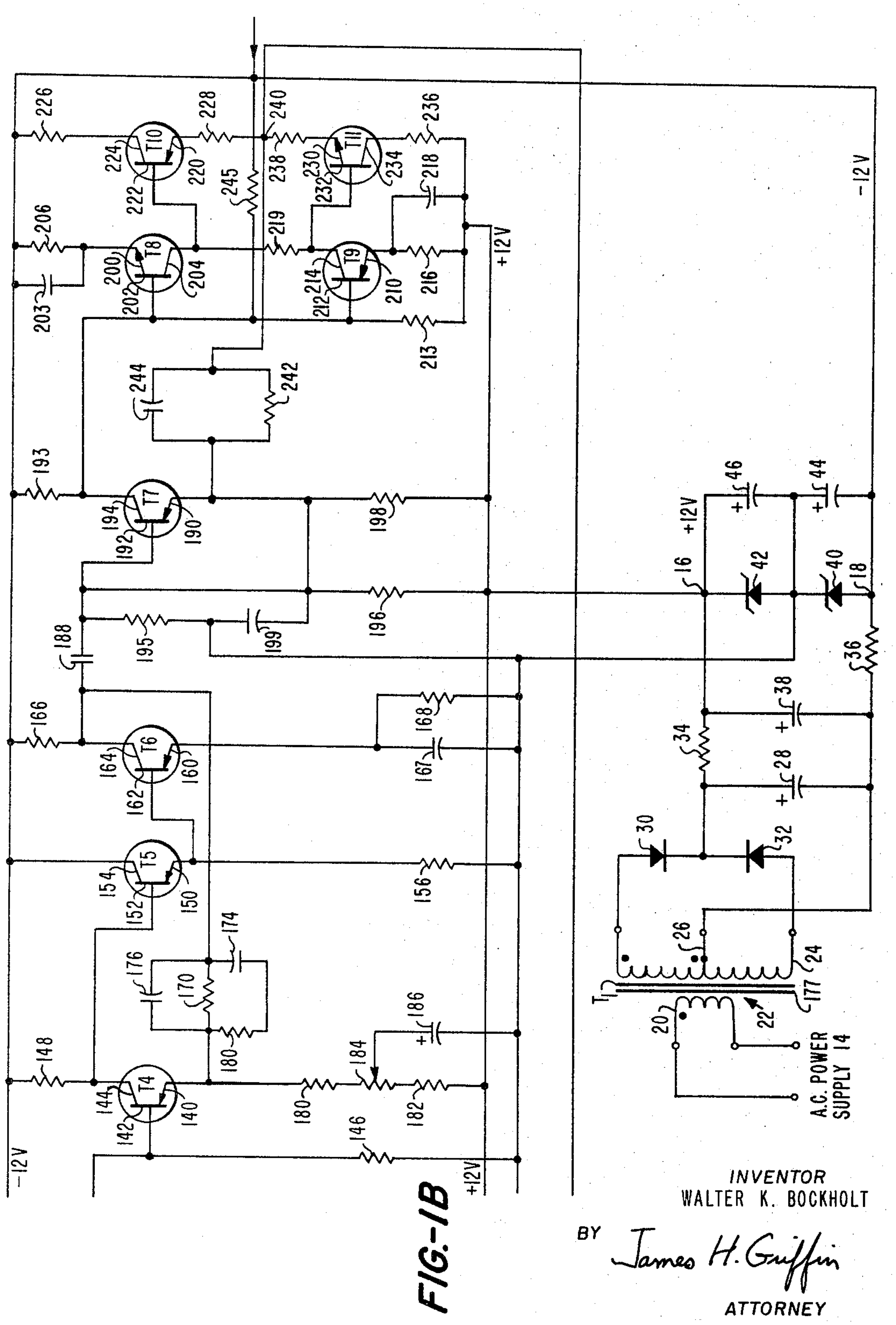
Figure 2:
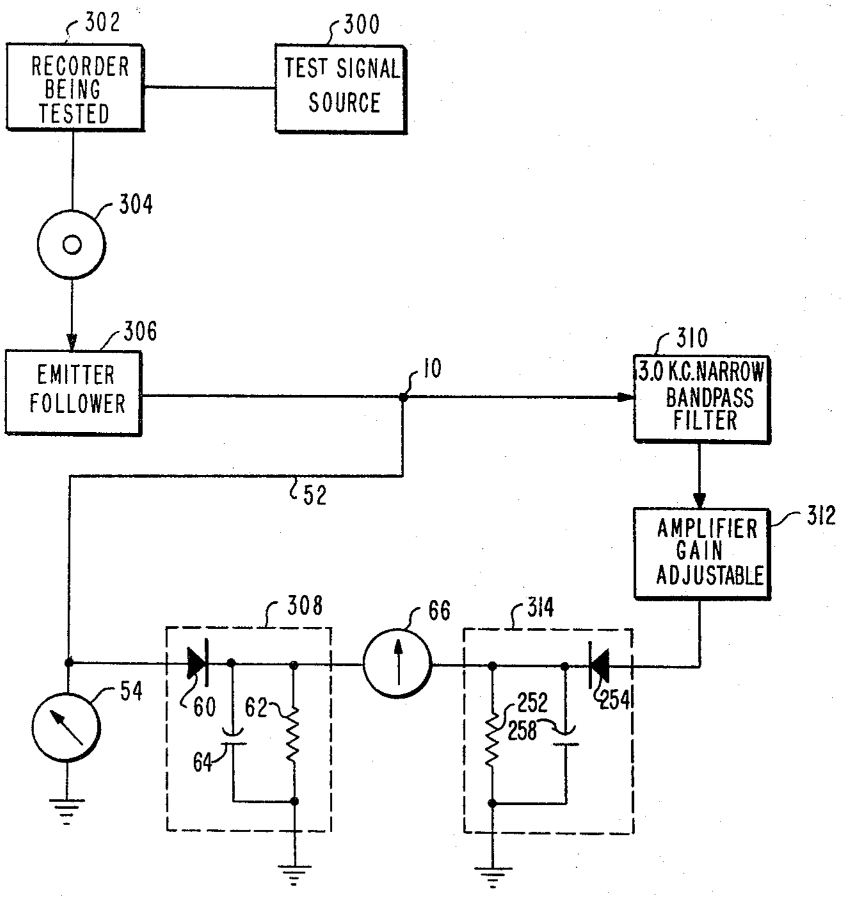

Other objects and features of this invention and a fuller understanding thereof may be had by referring to the following description and claims taken in conjunction with the accompanying drawings, in which:

FIGURES 1*a* and 1*b* are a schematic drawing of a preferred embodiment of applicant's improved distortion level monitor; and FIGURE 2 is a block diagram for the purpose of illustrating the operation thereof.

Referring to FIGURE 1*a*, the circuit which is a preferred embodiment of applicant's invention has an input terminal 10, a ground terminal 12, and AC power supply terminals 14. The AC power supply at 14 is converted into +DC (at the junction 16) and −DC (at the junction 18) in the following manner: the AC power supply is coupled across the primary 20 of a transformer 22. The secondary 24 of the transformer 22 has a center tap 26 coupled to one end of a capacitor 28; while the ends of the secondary are coupled through two rectifying diodes 30, 32 to the other end of the capacitor 28. The AC voltage developed across the capacitor 28 is smoothed by the RC combinations of resistors 34, 36, the capacitor 28, and another capacitor 38 and then applied across two Zener diodes 40 and 42, having noise decoupling capacitors 44 and 46, respectively. The Zener diode 40 and the decoupling capacitor 44 are coupled in parallel between the −DC junction 18 and ground 12. The Zener diodes 42 and the decoupling capacitor 46 are coupled between the +DC junction 16 and ground 12. Thus, a substantially constant DC voltage centered about ground 12 is maintained at the junctions 16 and 18 as a power supply for the rest of the circuit.

Signals appearing at the input terminal 10 are divided at the junction 50 into two paths. The first path, through the line 52, carries the whole signal to an input level meter 54. Beyond the input level meter 54, the signal is passed through a coupling capacitor 56 (grounded through a resistor 58) to a rectifier 60. Following rectification at 60, the signal is smoothed in a filter comprising a resistor 62 and a capacitor 64 coupled in parallel to ground 12. After being smoothed by the filter network 62, 64, the signal is applied to one side of a distortion level meter 66, a center scale voltmeter.

While the signal path through the line 52 carries the entire signal to the one side of the distortion level meter 66, the other path beginning with a resistor 70 is designed to pass only one harmonic of the input signal. Thus, the signal is passed through a first series of band-pass filters, wherein the parallel combination of a capacitor 72 and an inductor 74 is coupled between the resistor 70 and ground ground and is connected through a resistor 76 to a second parallel combination of a capacitor 78 and an inductor 79. The output of this first series of filters is then applied to a first amplification stage.

The first amplification stage comprises the transistors T1, T2, and T3, having emitters 80, 90, and 100, bases 82, 92, and 102, and collectors 84, 94, and 104, respectively. The base 82 of the transistor T1 is coupled to receive the signal from the first series of filters and is coupled to ground through a resistor 86. The collector 84 of the transistor T1 is coupled to the −12 volt power supply line through a resistor 88 and is directly coupled to the base 92 of the transistor T2. Transistor T2 is coupled in emitter-follower configuration, its collector 94 being directly coupled to the −12 volt supply line; its emitter 90 is directly coupled to the base 102 of the transistor T3 and to the +12 volts supply line through a resistor 96. The emitter 100 of the transistor T3 is coupled to ground through the parallel combination of a capacitor 106 and resistor 107. The collector 104 of the transistor T3 is coupled to the −12 volt power supply line through a resistor 108.

A feedback network between the collector 104 of the transistor T3 (the output terminal for the first amplifier) and the emitter 80 of the transistor T1 comprises the parallel combination of a capacitor 110, a resistor 112, and the series combination of a capacitor 114 and resistor 116. This feedback network lowers the output impedance of the first amplifier and provides the usual flattening effect.

A variable resistance network comprising two resistors 118 and 120 and a variable resistor 122 is coupled between the collector 80 of the transistor T1 and the +12 v. DC power supply junction 16. The wiper of the variable resistor 122 is coupled to ground 12 through a capacitor 124.

The collector 104 of the transistor T3 is coupled to a second band-pass filter stage similar to the first described above, having two resistors 126 and 128, two capacitors 130 and 132, and two inductors 134 and 136 in the same arrangement. Following the second filter stage is a second amplifier similar to the first described above, with transistors T4, T5, and T6 (having emitters 140, 150, and 160, bases 142, 152, and 162, and collectors 144, 154, and 164, respectively), resistors 146, 148, 156, 166, and 168, capacitor 169, feedback network (resistors 170 and 172 and capacitors 174 and 176), and variable resistance network (resistors 180 and 182, variable resistor 184, and capacitor 186).

The output of the second amplifier (the signal on the collector 164 of the transistor T6) is applied through a coupled capacitor 188 to a drive amplifier comprising the transistors T7, T8, T9, T10, and T11 (having emitters 190, 200, 210, 220, and 230, bases 192, 202, 212, 222, and 232, and collectors 194, 204, 214, 224, and 234, respectively) and their associated components. The transistor T7 is coupled in essentially grounded emitter configuration, with its base coupled to receive the signal to be amplified through the coupling capacitor 188 coupled to ground through a resistor 195 and to the +12 v. DC power supply 16 through a resistor 196. The base 192 is coupled to the +12 v. DC power supply 16 through two resistors 197 and 198, which have a decoupling capacitor 199 connected between them. A resistor 193 is coupled between the collector 194 and the −12 v. DC power supply 18.

The signal from the collector 194 of the transistor T7 is coupled directly to the base 202 of the transistor T8 and through a blocking capacitor 203 to the base 212 of the transistor T9. The base 212 is coupled to the +12 v. DC power supply 16 through a resistor 213. The emitter 200 of the transistor T8 is coupled to the −12 v. DC junction 18 through the parallel combination of a resistor 206 and a capacitor 208, while the emitter 210 of the transistor T9 is coupled to the +12 v. DC power supply 16 through the parallel combination of a resistor 216 and a capacitor 218. The collectors 204 and 214 of the transistors T8 and T9, respectively, are joined through a resistor 219. Thus, the transistors T8 and T9 are coupled to act as complementary push-pull amplifiers, with output appearing on the collectors 204 and 214.

The transistor T10, essentially in emitter-follower configuration, is coupled to receive the output of the transistor T8; accordingly, its base 222 is directly coupled to the collector 204 of the transistor T8. The collector 224 of the transistor T10 is coupled to the −12 v. D.C. power supply 18 through a resistor 226. The transistor T11, also in emitter-follower configuration, is coupled to receive the output of the transistor T9, its base 232 being directly coupled to the collector 214. The collector 234 of the transistor T11 is coupled through a resistor 236 to the +12 v. DC power supply 16.

The emitters 220, 230 of the transistor T10, T11, respectively, are coupled to an output junction 240 of the drive amplifier through resistors 228 and 238, respectively. Both AC and DC feedback are supplied from the output junction 240 to the emitter 190 of the transistor T7 through the parallel combination of a resistor 242 and a capacitor 244. DC stabilization feedback is also supplied from the emitter 220 of the transistor T10 to the bases 202, 212 of the transistors T8, T9, respectively, through a resistor 246.

The signal at the output junction 240 of the drive amplifier passes through a coupling capacitor 250 (grounded through a resistor 252) to a rectifier 254. Following rectification at 254, the signal is smoothed in a filter comprising a resistor 256 and a capacitor 258 coupled in parallel to ground 12. After being smoothed by the filter 256, 258, the signal is applied to a second side of the distortion level meter 66.

Referring to FIGURE 2, it will be seen that the overall system of which applicant's distortion level monitor is one part begins with a test signal source 300, which feeds in a test signal of a given frequency to the tape recorder being tested, represented at 302. The output from the tape recorder being tested 302 is applied to an input jack 304 coupled to an emitter-follower or other such circuit, represented at 306, which serves to isolate applicant's distortion level circuitry as shown schematically in FIGURE 1 from the circuitry of the recorder 302. The output of the emitter follower 306 is fed into the terminal 10 where it is divided into the full signal path 52 leading to the full signal smoothing filters represented at 308 and the band-pass filter path, represented by the filters 310 and the amplifiers 312. After the selected harmonic passed by the filters (usually the third harmonic) has been amplified to the strength equal to the full signal input passing through the path 52, it is applied to a smoothing filter network represented at 314.

In the use of the above-described distortion level monitor for adjusting the record level of a tape recorder, a signal from the reproduce amplifier of the recorder to be adjusted is fed into the input jack 304. The signal then passes through the emitter follower 306 and is applied to both the 3 kc. narrow band-pass filter 310 and to the input level monitor meter 54. Then the record amplifier of the recorder is adjusted to a record level that will produce 1% third harmonic distortion of a recorded signal of 1 kc.

The signal applied to the input level monitor 54 is rectified by the circuit 308, consisting of the rectifier 60, resistor 62, and capacitor 64, with voltage being developed across the resistor 62 and ripple being filtered by the capacitor 64. The voltage developed across the resistor 62 is applied to one side of zero-center distortion level meter 66. After the same 1 kc. signal is passed through the 3 kc. filter 310 only the third harmonic or 3 kc. remains. The amount of 3 kc. signal beyond this point is determined by the amount of third harmonic distortion contained in the 1 kc. signal coming from the reproducer. The 3 kc. signal is amplified in the amplifier 312, where the amplifier gain has been preadjusted using a standard third harmonic generator such that the amplitude of the 3 kc. signal is applied to the network 314 is equal to the amplitude of the 1 kc. signal in the line 52 when the third harmonic distortion of the 1 kc. signal is 1%. Thus, when any 1 kc. signal is applied to the input terminal 10 and the distortion is 1% third harmonic, the meter 66 will read center scale.

An important feature of this device lies in the fact that if there is an increase in input amplitude at 304 the level at both networks 308 and 314 will increase a like amount, so that the meter 66 will still continue to read center scale; thus, a center scale reading means 1% distortion regardless of input amplitude.

A distortion level monitor in accordance with description and drawing was built and operated using the following components:

Voltages:
14–117 volt, 60 c.p.s. AC

| | |
|---|---|
| Transistors: | |
| T1 | 2N504 |
| T2 | 2N414 |
| T3 | 2N414 |
| T4 | 2N504 |
| T5 | 2N414 |
| T6 | 2N414 |
| T7 | 2N604 |
| T8 | 2N446A |
| T9 | 2N414 |
| T10 | 2N414 |
| T11 | 2N446A |
| Diodes: | |
| 30 | SD94 |
| 32 | SD94 |
| 40 | 1N1594A |
| 42 | 1N1594A |
| 60 | 1N193 |
| 254 | 1N193 |
| Resistors: | Ohms |
| 34 | 300 |
| 36 | 300 |
| 58 | 2.2K |
| 62 | 4.7K |
| 70 | 27K |
| 76 | 18K |
| 86 | 100K |
| 88 | 66.5K |
| 96 | 33K |
| 107 | 365 |
| 108 | 2.26 |
| 112 | 45.3K |
| 116 | 47K |
| 118 | 180 |
| 120 | 35.7K |
| 122 | 200 |
| 126 | 18K |
| 128 | 18K |
| 146 | 100K |
| 148 | 66.5K |
| 156 | 33K |
| 166 | 2.26 |
| 168 | 365 |
| 170 | 45.3K |
| 172 | 47K |
| 180 | 180 |
| 182 | 35.7K |
| 184 | 200 |
| 193 | 4700 |
| 195 | 3300 |
| 196 | 45K |
| 197 | 680 |
| 198 | 10K |
| 206 | 1500 |
| 213 | 10K |
| 216 | 1500 |
| 219 | 530 |
| 226 | 470 |
| 228 | 47 |
| 236 | 600 |
| 238 | 47 |
| 242 | 3300 |
| 246 | 22K |
| 252 | 2.2K |
| 256 | 4.7K |
| Capacitors: | Microfarads |
| 28 | 500 |
| 38 | 500 |
| 44 | 500 |
| 46 | 500 |
| 56 | .22 |
| 64 | 10 |
| 72 | .033 |
| 78 | .033 |
| 106 | $750\times10^{-6}$ |
| 110 | $5\times10^{-6}$ |
| 114 | 1.0 |
| 124 | 300 |
| 130 | .033 |
| 132 | .033 |
| 169 | $750\times10^{-6}$ |

| Capacitors: | Microfarads |
|---|---|
| 174 | 1.0 |
| 176 | $5\times10^{-6}$ |
| 186 | 300 |
| 188 | 5 |
| 203 | 30 |
| 208 | $100\times10^{-6}$ |
| 218 | $100\times10^{-6}$ |
| 244 | $47\times10^{-6}$ |
| 250 | .22 |
| 258 | 10 |
| **Inductors:** | **Microhenries (variable)** |
| 74 | 100 |
| 79 | 100 |
| 134 | 100 |
| 136 | 100 |

The above specified circuit was operated with a 1,000 c.p.s. test signal supplied at 300 to the recorder being tested 302. The filters represented schematically at 310 passed the third harmonic of the test signal, i.e., 3 kc. The input at the power supply terminals 14 was 117 volt, 60 cycle AC current. Although the time required to adjust the distortion level of one tape track using prior test equipment was over ten minutes, the time required using applicant's distortion level monitor was less than one minute; in fact, ten seconds per channel is usual.

Thus, applicant has provided an improved distortion level monitor which requires minimal time to adjust the record level of a magnetic tape recorder and yet is cheaper, lighter, and therefore more easily adaptable to large composite test sets than prior equipment used for this purpose. Since applicant's distortion level monitor is responsive only to the relative percentages of the input test signal and some selected harmonic (usually the third harmonic) thereof, it is not affected by the reproduce bounce phenomenon or other input variations, which had made record level adjustment such a difficult task with prior distortion level monitors. The model constructed operated with the input varied between .5 and 2.5 volts R.M.S.

A number of alternative arrangements will readily suggest themselves to those skilled in the art. For example, N-P-N conductivity type transistors and P-N-P conductivity type transistors may be interchanged, if only the power supply, biasing elements, and other circuit components are appropriately reversed. However, although the invention has been described with a certain degree of particularity, it is to be understood that the present disclosure has been made only by way of example and that numerous changes in the details of construction and the combination and arrangement of parts may be resorted to without departing from the spirit and the scope of the invention as hereinafter claimed.

What is claimed is:

1. A distortion level monitor having an input terminal, a ground terminal, a first capacitor coupled to the input terminal, a first rectifier coupled to the first capacitor, the parallel combination of a first resistor and a second capacitor coupled between the first rectifier and the ground terminal, a center scale voltmeter having two input terminals, one of said input terminals being coupled to the first rectifier, a second resistor coupled to the input terminal, the parallel combination of a third capacitor and first inductor coupled between the input terminal and ground, a third resistor coupled to the second resistor, the parallel combination of a second inductor and a fourth capacitor coupled between the third resistor and ground, a first transistor having emitter, base, and collector, the base of the first transistor being coupled to the third resistor and being coupled through a fourth resistor to ground, the emitter of the first transistor being coupled to a first variable resistor, a wiper on the first variable resistor being coupled through a fifth capacitor to ground, a second transistor having emitter, base, and collector, the base of the second transistor being coupled to the collector of the first transistor, a third transistor having emitter, base, and collector, the base of the third transistor being coupled to the emitter of the second transistor, the emitter of the third transistor being coupled through the parallel combination of a fifth resistor and a sixth capacitor to ground, a feedback network between the collector of the third transistor and the emitter of the first transistor, said feedback network comprising the parallel combination of a seventh capacitor, a sixth resistor, and a seventh resistor and an eighth capacitor in series, an eighth resistor coupled to the collector of the third transistor, the parallel combination of a third inductor and a ninth capacitor coupled between the eighth resistor and ground, a ninth resistor coupled to the eighth resistor, the parallel combination of a fourth inductor and a tenth capacitor coupled between the ninth resistor and ground, a fourth transistor having an emitter, base, and collector, the base of the fourth transistor being coupled to the ninth resistor and coupled through a tenth resistor to ground, the emitter of the fourth transistor being coupled to a second variable resistor, a wiper of the second variable resistor being coupled through an eleventh capacitor to ground, a fifth transistor having emitter, base, and collector, the base of the fifth transistor being coupled to the collector of the fourth transistor, a sixth transistor having emitter, base, and collector, the base of the sixth transistor being coupled to the emitter of the fifth transistor, the emitter of the sixth transistor being coupled through the parallel combination of an eleventh resistor and a twelfth capacitor to ground, a feedback circuit coupled between the collector of the sixth transistor and the emitter of the fourth transistor, said feedback circuit comprising the parallel combination of a thirteenth capacitor, an eighteenth resistor, and a fourteenth capacitor and a nineteenth resistor in series, a fifteenth capacitor coupled to the collector of the sixth transistor, a seventh transistor having emitter, base, and collector, the base of the seventh transistor being coupled directly to the fifteenth capacitor, the emitter of the seventh transistor being coupled and through a sixteenth capacitor to ground, an eighth transistor having emitter, base, and collector, the base of the eighth transistor being coupled to the collector of the seventh transistor, a ninth transistor having emitter, base, and collector, the base of the ninth transistor being coupled through a seventeenth capacitor to the base of the eighth transistor, the collector of the ninth transistor being coupled through a fourteenth resistor to the collector of the eighth transistor, a tenth transistor having emitter, base, and collector, the base of the tenth transistor being coupled to the collector of the eighth transistor, and the emitter of the tenth transistor being coupled through a fifteenth resistor to the base of the ninth transistor, an eleventh transistor having emitter, base, and collector, the base of the eleventh transistor being coupled to the collector of the ninth transistor, a sixteenth resistor coupled to the base of the eleventh transistor, a seventeenth resistor coupled between the sixteenth resistor and the base of the tenth transistor, an eighteenth capacitor coupled between the sixteenth and seventeenth resistors, a second rectifier coupled to the eighteenth capacitor, the parallel combination of an eighteenth resistor and a nineteenth capacitor coupled between the second rectifier and ground, and a second input terminal of the center scale voltmeter coupled to the second rectifier.

2. A distortion level monitor having an input terminal, a ground terminal, positive and negative power supply terminals, a first capacitor coupled to the input terminal, a first rectifier coupled to the first capacitor, the parallel combination of a first resistor and a second capacitor coupled between the first rectifier and the ground terminal, a center scale voltmeter having two input terminals, one of said input terminals being coupled to the first rectifier, a second resistor coupled to the input terminal, the parallel combination of a third capacitor and first inductor coupled between the input terminal and ground, a third resistor coupled to the second resistor, the parallel combination of a second inductor and a fourth capacitor coupled between the third resistor and ground, a first transistor having emitter, base, and collector, the base of the first transistor being coupled to the third resistor and being coupled through a fourth resistor to ground, the emitter of the first transistor being coupled to the positive power supply terminal through a first variable resistor, a wiper on the first variable resistor being coupled through a fifth capacitor to ground, the collector of the first transistor being coupled through a fifth resistor to the negative power supply, a second transistor having emitter, base, and collector, the base of the second transistor being coupled to the collector of the first transistor, the collector of the second transistor being directly coupled to the negative power supply, and the emitter of the second transistor being coupled through a sixth resistor to the positive power supply, a third transistor having emitter, base, and collector, the base of the third transistor being coupled to the emitter of the second transistor, the collector of the third transistor being coupled through a seventh resistor to the negative power supply, and the emitter of the third transistor being coupled through the parallel combination of an eighth resistor and a sixth capacitor to ground, a feedback network between the collector of the third transistor and the emitter of the first transistor, said feedback network comprising the parallel combination of a seventh capacitor, a ninth resistor, and a series combination of a tenth resistor and an eighth capacitor, an eleventh resistor coupled to the collector of the third transistor, the parallel combination of a third inductor and a ninth capacitor coupled between the eleventh resistor and ground, a twelfth resistor coupled to the eleventh resistor, the parallel combination of a fourth inductor and a tenth capacitor coupled between the twelfth resistor and ground, a fourth transistor having an emitter, base, and collector, the base of the fourth transistor being coupled to the twelfth resistor and coupled through a thirteenth resistor to ground, the emitter of the fourth transistor being coupled through a second variable resistor to the positive power supply, a wiper of the second variable resistor being coupled through an eleventh capacitor to ground, the collector of the fourth transistor being coupled through a fourteenth resistor to the negative power supply, a fifth transistor having emitter, base, and collector, the base of the fifth transistor being coupled to the collector of the fourth transistor, the collector of the fifth transistor being coupled to the negative power supply, and the emitter of the fifth transistor being coupled through a fifteenth resistor to the positive power supply, a sixth transistor having emitter, base, and collector, the base of the sixth transistor being coupled to the emitter of the fifth transistor, the collector of the sixth transistor being coupled through a sixteenth resistor to the negative power supply, the emitter of the sixth transistor being coupled through the parallel combination of a seventeenth resistor and a twelfth capacitor to ground, a feedback circuit coupled between the collector of the sixth transistor and the emitter of the fourth transistor, said feedback circuit comprising the parallel combination of a thirteenth capacitor, an eighteenth resistor, and a fourteenth capacitor and a nineteenth resistor in series, a fifteenth capacitor coupled to the collector of the sixth transistor, a seventh transistor having emitter, base, and collector, the base of the seventh transistor being coupled directly to the fifteenth capacitor, through a twentieth resistor ot ground, and through a twenty-first resistor to the positive power supply, the emitter of the seventh transistor being coupled through a twenty-second resistor to the positive power supply and through a sixteenth capacitor to ground, the collector of the seventh transistor being coupled through a twenty-third resistor to the negative power supply, an eighth transistor having emitter, base, and collector, the base of the eighth transistor being coupled to the collector of the seventh transistor, the emitter of the eighth transistor being coupled through the parallel combination of a twenty-fourth resistor and a seventeenth capacitor to the negative power supply, a ninth transistor having emitter, base, and collector, the base of the ninth transistor being coupled through an eighteenth capacitor to the base of the eighth transistor and through a twenty-fifth resistor to the positive power supply, the emitter of the ninth transistor being coupled through the parallel combination of a twenty-sixth resistor and a nineteenth capacitor to the positive power supply, the collector of the ninth transistor being coupled through a twenty-seventh resistor to the collector of the eighth transistor, a tenth transistor having emitter, base, and collector, the base of the tenth transistor being coupled to the collector of the eighth transistor, the collector of the tenth transistor being coupled through a twenty-eighth resistor to the negative power supply, and the emitter of the tenth transistor being coupled through a twenty-ninth resistor to the base of the ninth transistor, an eleventh transistor having emitter, base, and collector, the base of the eleventh transistor being coupled to the collector of the ninth transistor, the collector of the eleventh transistor being coupled through a thirtieth resistor to the positive power supply, a thirty-first resistor coupled to the base of the eleventh transistor, a thirty-second resistor coupled between the thirty-first resistor and the base of the tenth transistor, a twentieth capacitor coupled between the thirty-first and thirty-second resistors, a second rectifier coupled to the twentieth capacitor, the parallel combination of a thirty-third resistor and a twenty-first capacitor coupled between the second rectifier and ground, and a second input terminal of the center scale voltmeter coupled to the second rectifier.

References Cited

UNITED STATES PATENTS

| | | | |
|---|---|---|---|
| 2,576,249 | 11/1951 | Barney | 324—77 |
| 2,578,348 | 12/1951 | Gannett | 324—57 XR |
| 2,760,011 | 8/1956 | Berry | 324—82 |
| 2,785,377 | 3/1957 | MacFee et al. | 324—77 |
| 3,197,701 | 7/1965 | Sangl et al. | 324—78 |

RUDOLPH V. ROLINEC, *Primary Examiner.*

WALTER L. CARLSON, *Examiner.*

P. F. WILLE, *Assistant Examiner.*